United States Patent [19]
Davenport et al.

[11] Patent Number: 5,311,582
[45] Date of Patent: May 10, 1994

[54] INTEGRATED COCOT AND REGULATED PAYSTATION TELEPHONE SYSTEM

[75] Inventors: Marcus K. Davenport, Cumming; Richard K. Shipman, Woodstock; Thomas Young, Snellville; Stephen H. Strode, Norcross, all of Ga.

[73] Assignee: International Teleservice Corporation, Melbourne, Fla.

[21] Appl. No.: 5,417

[22] Filed: Jan. 19, 1993

Related U.S. Application Data

[63] Continuation of Ser. No. 740,841, Aug. 6, 1991, abandoned.

[51] Int. Cl.⁵ .................... H04M 3/42; H04M 11/02; H04M 15/12
[52] U.S. Cl. ..................................... 379/143; 379/155
[58] Field of Search ............... 379/150, 143, 144, 145, 379/146, 154, 155

[56] References Cited

U.S. PATENT DOCUMENTS

| | | | |
|---|---|---|---|
| 3,863,036 | 1/1975 | McCrudder | 379/146 X |
| 4,535,555 | 6/1990 | Hellwerth et al. | 379/144 X |
| 4,768,223 | 8/1988 | Kinushita et al. | 379/143 |
| 4,924,497 | 5/1990 | Smith et al. | 379/150 |
| 4,924,497 | 5/1990 | Smith et al. | 379/155 |
| 5,113,433 | 5/1992 | Hird et al. | 379/155 X |
| 5,150,403 | 9/1992 | Jordan | 379/155 X |

OTHER PUBLICATIONS

Series 8000 Installation Guide by Protel, Inc., Document No. 000 313, Jul. 8, 1991.

Primary Examiner—Stephen Chin
Assistant Examiner—Paul Loomis
Attorney, Agent, or Firm—Evenson, McKeown, Edwards & Lenahan

[57] ABSTRACT

An integrated customer owned coin operated telephone (COCOT) and regulated paystation telephone system permits the functionality of the paystation to be remotely programmed, in order to increase the versatility of the paystation in either mode of operation. The integrated paystation telephone system includes a central microprocessor coupled with a memory that stores the firmware for operating the paystation telephone. Circuitry is provided under the control of the microprocessor to operate such functions as the power control and coin relay (the relay which excepts or refunds a deposited coin) in either mode of operation. The paystation telephone system is remotely configured to operate in either the COCOT or regulated mode without requiring any hardware changes. Because of the remote configuration of the paystation telephone system, various features can be programmed, increasing the versatility of the paystation.

28 Claims, 14 Drawing Sheets

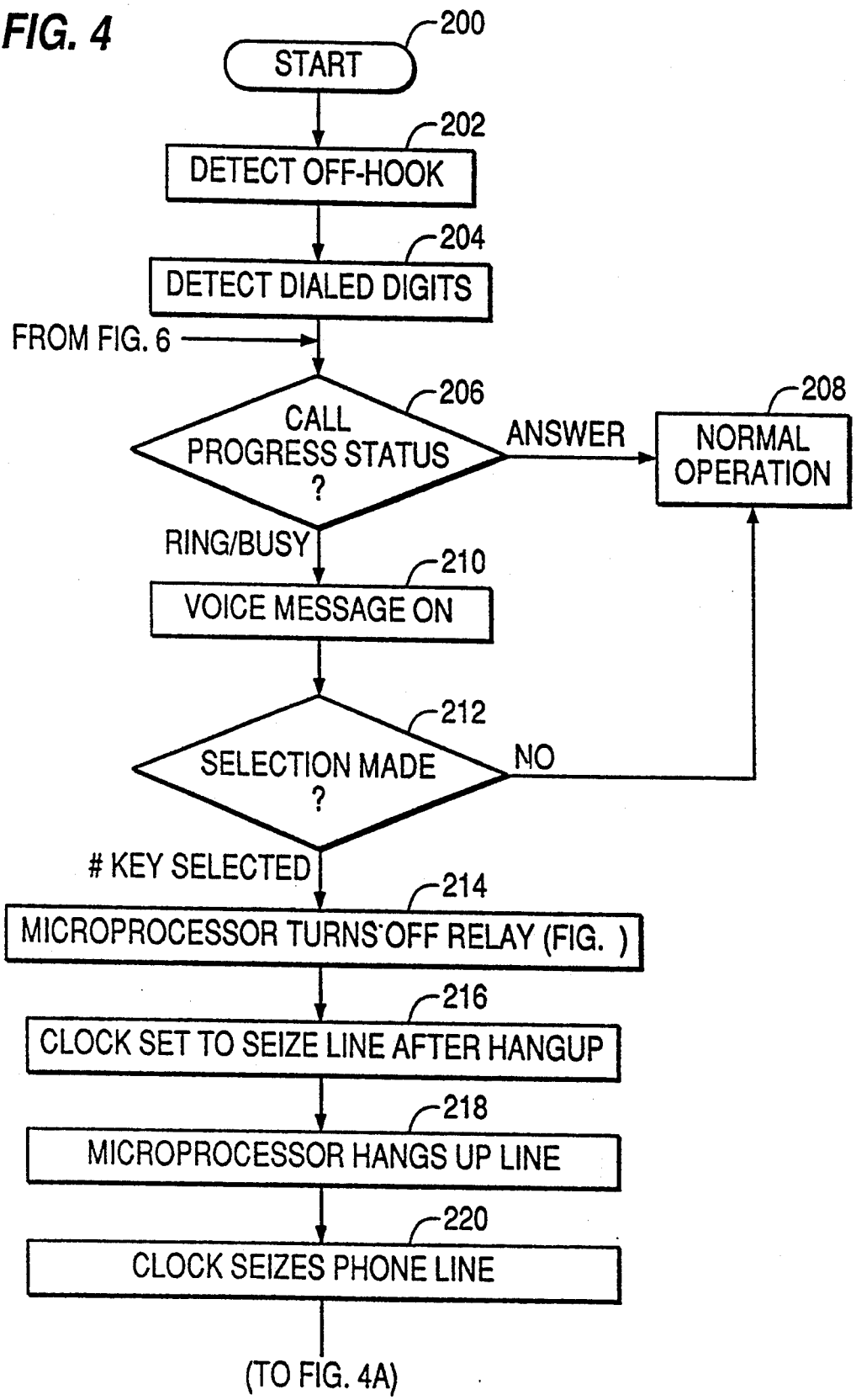

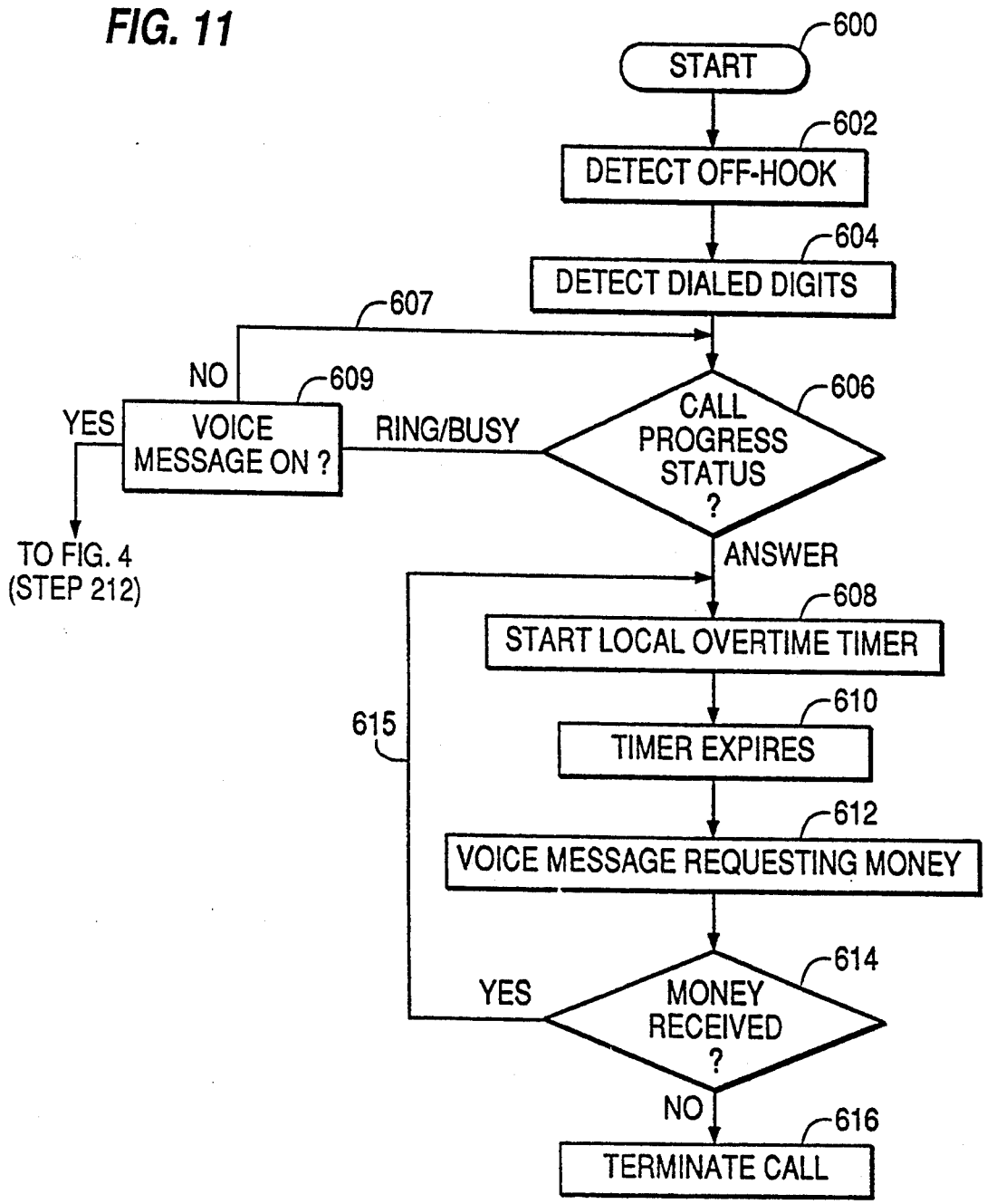

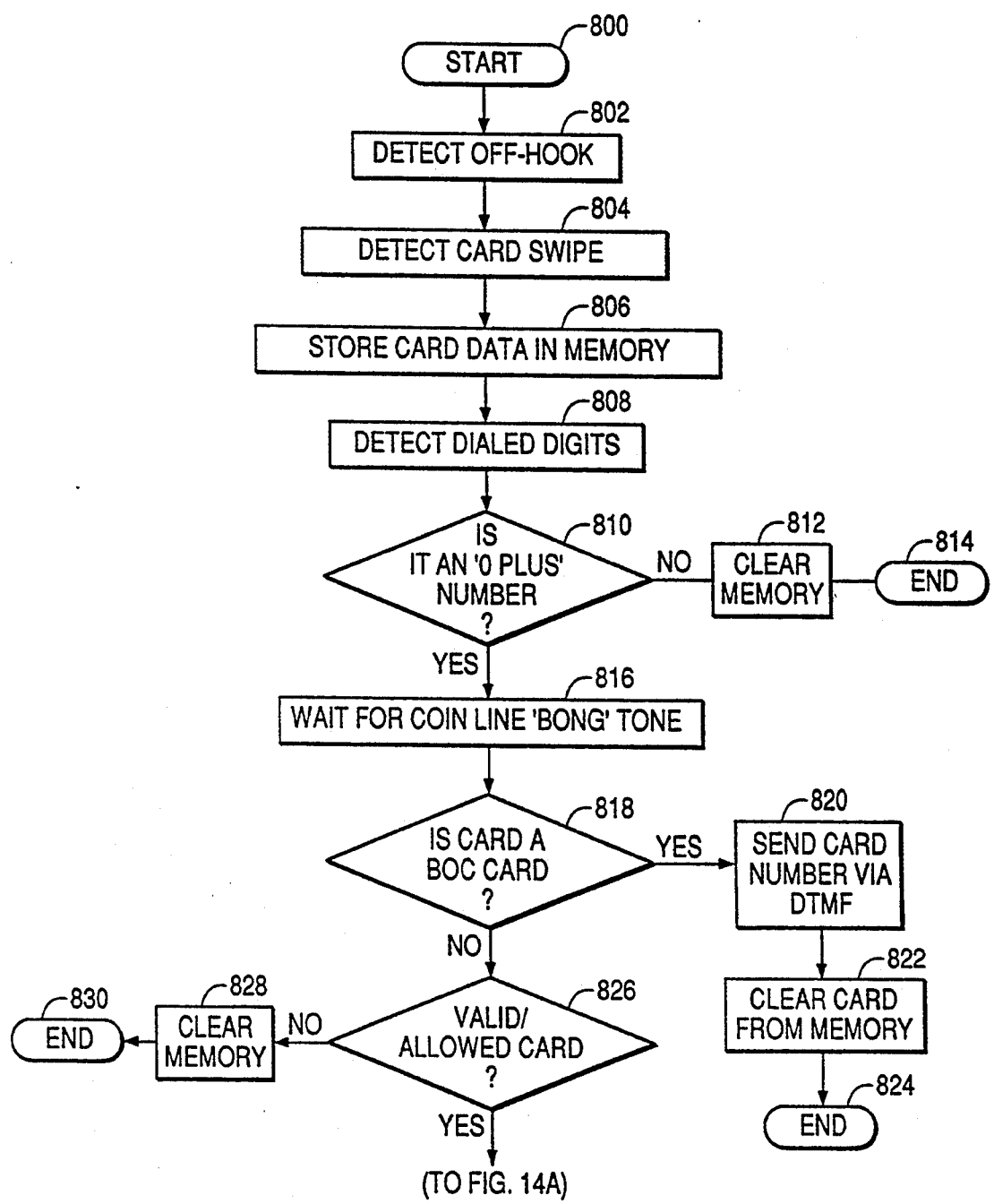

INTEGRATED COCOT AND REGULATED PAYSTATION TELEPHONE SYSTEM

This is a continuation of application Ser. No. 07/740,841, filed Aug. 6, 1991, now abandoned.

FIELD OF THE INVENTION

The present invention relates in general to telephone systems and is particularly directed to a paystation telephone system which combines both a customer owned, coin operated telephone (COCOT) and a regulated line or coin line system into an integrated paystation telephone.

BACKGROUND OF THE INVENTION

Presently, paystation telephone systems are manufactured and produced to operate in a regulated line or coin line environment or in a customer owned, coin operated telephone (COCOT), e.g. business line environment. Paystations operable in the coin line mode are generally controlled via a central office through the use of the telephone line ring/tip pair and a ground line. The Bell operating companies are examples of a regulated system which control numerous paystations throughout the United States. In contrast, the COCOT systems are produced for individual owners who maintain, service and operate the COCOT paystations as a business for profit. COCOT paystations include a microprocessor providing the intelligence to operate the paystation. Programs are stored in the microprocessor's memory for carrying out the features of the paystation. However, once conventional COCOT telephones are installed in the field, the owner cannot change any functional operations of the paystation but rather can only affect certain paystation characteristics such as calling rates, etc.

Because each system is controlled differently, vendors supplying paystations to regulated companies and individual customers currently produce either two separate paystation telephone units or a single unit which requires the removal and insertion of circuit cards in order to change the operation from a coin line telephone to a COCOT telephone. The use of two separate paystations has the disadvantages of not allowing the paystations to be interchanged and increases a manufacturers overall cost due to the necessity of carrying two distinct product lines. Similarly, requiring a change of circuit cards is disadvantageous because it increases the time and labor costs associated with servicing the phones installed in the field. These problems arise because each system is controlled differently—coin line systems by a central office and COCOT systems by the paystation itself. It has heretofore been unable for vendors to integrate such systems due to their individual control and operating characteristics. For example, the paystation telephone must operate differently to carry out such features as voice messaging, charging for incoming calls, coin tone fraud prevention, safety checks, coin disposal (how the paystation collects and refunds), dialing sequence (whether the paystation passes the digits dialed directly to the telephone line or buffers the digits and then sends them to the telephone line), voice prompts (where the paystation voices a message to the paystation user), and the like, when controlled via the central office in the regulated system or when controlled via the microprocessor contained within the paystation in a COCOT system.

There is therefore needed a paystation telephone system that integrates both a COCOT and a coin line system, without requiring hardware modifications, and provides a wide range of paystation features operable in either mode.

SUMMARY OF THE INVENTION

In accordance with the present invention, the above-mentioned needs are met by an integrated COCOT and regulated paystation telephone system which permits the functionality or features of the paystation to be remotely programmed, in order to increase the versatility of the paystation in either mode of operation. The features can thus be selectively enabled or disabled when the paystation is connected to either a regulated line or a business line.

Pursuant to the invention, the integrated paystation telephone system includes a central microprocessor coupled with an external RAM memory that stores the firmware for operating the paystation telephone. Novel circuitry is provided under the control of the microprocessor to operate such functions as the power control and coin relay (the relay which excepts or refunds a deposited coin) in either mode of operation. A more detailed description of the power control and coin relay circuitry is provided in co-pending application Ser. No. 07/740,576, filed on even date herewith and entitled "Circuit for Firing Paystation Coin Relay Using Power Derived From Telephone Line Tip/Ring Voltage", the specification of which is herein incorporated by reference. Further, call progress or answer supervision circuitry is provided to enhance the availability of other paystation telephone features according to the present invention. The call progress circuitry is described in greater detail in co-pending application Ser. No. 07/745,594, filed on even date herewith and entitled "Answer Supervision Circuit For Paystation Telephone With Non Muted Microphone", the specification of which is herein incorporated by reference.

It is a advantage of the integrated COCOT and regulated paystation telephone system of the present invention to be remotely configured to operate in either a COCOT or coin line mode without requiring any hardware changes. This is accomplished via the microprocessor reading a status bit set in the firmware downloaded into the external RAM memory to determine its mode of operation.

The paystation telephone system of the present invention further allows for voice messaging systems to be implemented for both coin line and COCOT operation. For coin line operation, a microprocessor open circuits the coin relay such that the central office signal refunding a caller's coin is inhibited. This allows the voice message system to operate. The deposited coin is then collected after the caller leaves his voice message and the phone line is released.

Another novel feature of the integrated paystation telephone system is its operability to detect coin tone fraud via filters provided in the call progress circuitry. The microprocessor controls the filters such that they detect when coin tones are being generated from the handset microphone and, in response thereto, mutes the handset microphone so as to disrupt the coin tone generation.

Still another advantage of the present invention is the provision of a safety program which detects if the paystation housing case is properly grounded so as to avoid shocks to a caller resulting from an accidental charging of the paystation housing case via an AC line. The microprocessor operates to read a case ground sensor signal indicating whether the case is grounded and to report the results thereof.

Yet another advantage of the present invention is its operability to determine the actual connect time between the calling and called parties in order to determine whether overtime charges should be applied for local calls. The call progress circuitry indicates when the called party actually answers the phone which signals the microprocessor to begin a local overtime timer set to a pre determined time stored in the external memory. Once the timer expires, the microprocessor generates a voice signal requesting further money to continue the call. Use of the actual connect time is an advantage over the prior devices which normally begin timing after a pre-set delay period once the call is made, e.g. 15-20 seconds. The present invention provides for a more accurate timing of the conversation based on the actual connect time.

Another advantage of the present invention is its operability to prohibit long distance or 'one-plus' telephone calls when the cash box, which receives the deposited coins, is stolen or otherwise missing. The microprocessor is controlled via a program to read a cash box sensor to determine its presence. If the sensor indicates the cash box is missing, the microprocessor prohibits any coin tones from being output over the phone line thus eliminating long distance phone call capability in a regulated system. Furthermore, for local calls, the microprocessor can keep open a circuit path from the telephone line tip to ground such that the central office will not detect that the initial calling rate, i.e. the amount of money to be charged for the call, for a local call has been met. Hence, the central office will not allow a local call.

Still yet another advantage of the present invention is the provision for the paystation telephone system to accept any type of credit or bank card to be used for placing calling or credit card calls, otherwise referred to as 'zero-plus' calls. Whereas currently regulated lines, such as the Bell operating companies, only allow use of their own or related calling cards, the present invention provides a program for the microprocessor to store a credit card number input by the caller for comparison with stored credit card numbers which have been approved for use by the particular paystation. These numbers can be continuously changed via the down-loading feature into the external RAM memory.

Other objects, advantages and novel features of the present invention will become apparent from the following detailed description of the invention when considered in conjunction with the accompanying drawings.

BRIEF DESCRIPTION OF THE DRAWINGS

FIGS. 4 and 4a provide a flow chart illustrating the method for operating the paystation telephone system with voice messaging service;

FIG. 11 is a flow chart illustrating the method for operating the paystation to time local calls based on the actual connect time with the called party;

FIG. 14 and 14a provide a flow chart illustrating the method of operating the paystation to accept any bank or credit card programmed into, the paystation.

DETAILED DESCRIPTION

Figure 1:
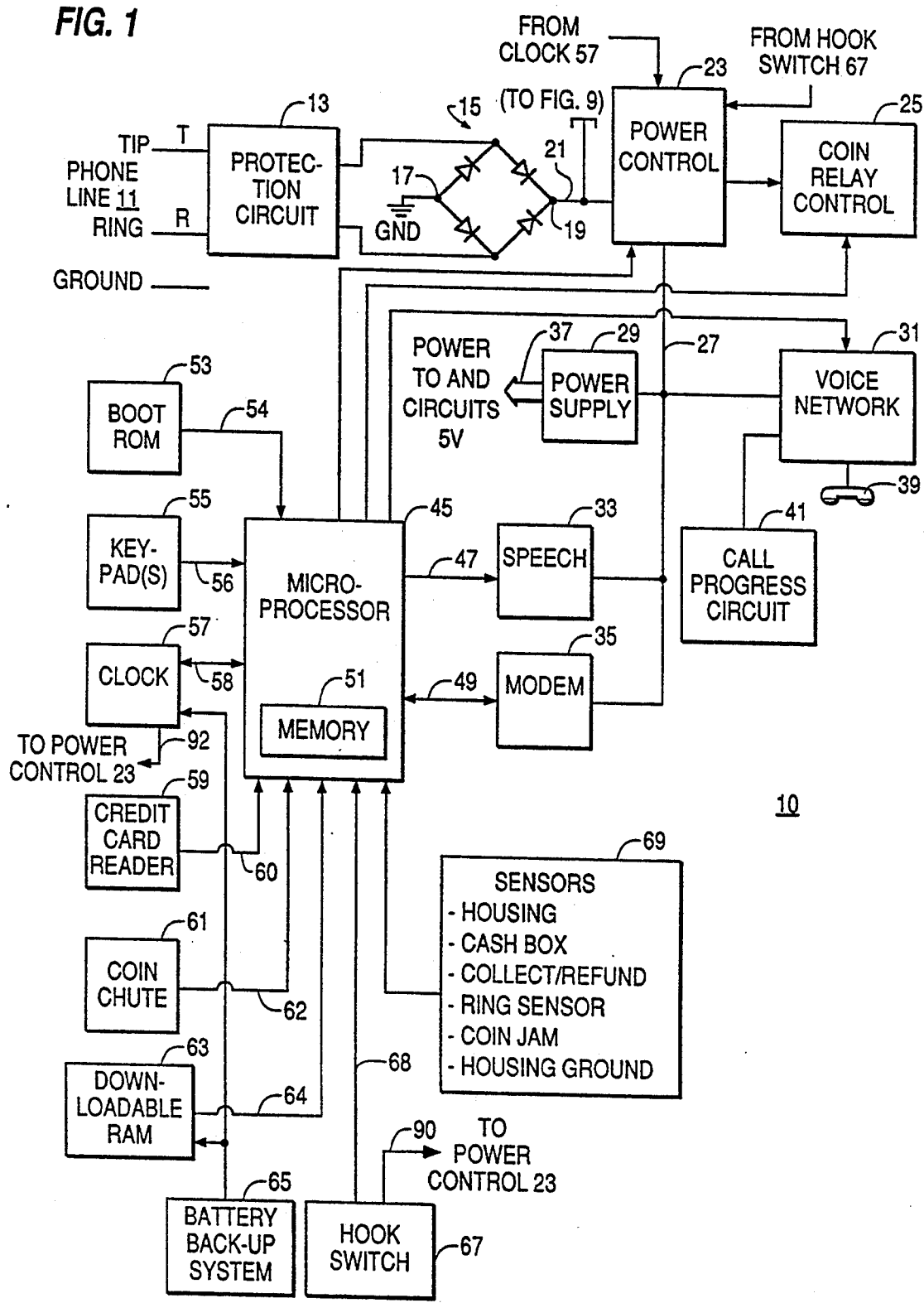
FIG. 1 is a simplified block diagram illustrating the paystation telephone system according to the present invention.

Referring to FIG. 1, there is shown an overall block diagram of an integrated paystation telephone system 10 operable in both a regulated or non-regulated, i.e. COCOT, mode. The paystation telephone system 10 is coupled to a telephone line tip/ring pair 11 for COCOT operation and to the tip/ring pair 11 and a ground line for the regulated or coin line operation. The telephone line tip/ring pair 11 is coupled through an over-voltage protection circuit 13 (i.e. a back-to-back Zener diode pair bridging tip and ring) to a full wave bridge circuit 15, a first node 17 of which is coupled to a reference potential (ground) and a second node 19 of which is coupled to a line 21. The potential of line 21 is normally at some prescribed differential (i.e. 48V) relative to ground node 17. Line 21 couples with a power control circuit 23, one output of which controls a coin relay control circuit 25. The operation of the power control circuit 23 and coin relay control circuit 25 are more fully described in co-pending application Ser. No. 07/740,576 entitled "Circuit for Firing Paystation Coin Relay Using Power Derived From Telephone Line Tip/Ring Voltage", incorporated by reference above.

The power control circuit 23 includes another output line 27, carrying both power and audio signals, which is coupled to a power supply circuit 29, voice network circuit 31, and speech and modem processing circuits 33 and 35, respectively. The power supply circuit 29 receives over line 27 the available current from the phone line 11, e.g. in the range of 20 to 100 mA, and maintains a regulated five (5) volt output. The 5v output over power supply line 37 from the power supply 29 provides the supply voltage to the other components in the paystation telephone system 10.

The voice network 31 is of a conventional type providing standard two-to-four line conversion for coupling with a telephone handset 39. The voice network 31 further includes an output coupling to a call progress circuit or answer supervision circuit 41 which determines the status of a call placed from a paystation, i.e., has the called station's telephone been answered or not.

The call progress circuit 41 employs a transmitter-sourced audio signal discrimination circuit (FIG. 7) which monitors all audio signals which have been placed on the line, either from the called station or the calling paystation, and controllably removes or subtracts out those audio signals which originate at the paystation transmitter during answer supervision operation. The transmitter audio signal discriminator preferably includes a pair of tunable (adjustable-Q) bandpass filters respectively associated with the telephone line receiver and the paystation transmitter circuit. Coupled to these filters is an audio spectrum scanner which sequentially adjusts the sensitivity characteristics of the filters. Q-adjustment of each filter is affected by controlling the value of a time constant setting resistor that determines the transfer function of each of a set of cascaded filter stages, with tuning of the filter's center frequency being a function of the duty cycle of a variation in each stages resistor value. The output of the receiver filter is coupled through a transmitter-modifier representative of the effects of the circuit components and the like, so as to adjust transmitter-sourced audio signals to a level that will permit them to be correctly excised from the receiver filter's output. A more detailed description of the operation of the call progress circuit and its features is described in co-pending application Ser. No. 07/745,594, incorporated by reference above.

The speech generating circuit 33 is of a conventional type providing a standard digital-to-analog (D-A) conversion and includes a smoothing circuit. Digital data received by the speech generating circuit 33 is converted to analog signals and smoothed before being output on the audio path 27. The modem 35 allows for the transmission and reception of data from the paystation telephone system 10 via the phone line 11. Both the speech generating circuit 33 and the modem 35 are capable of generating a dual tone multi-frequency (DTMF) signal for output over the phone line 11.

A microprocessor 45 is connected via line 47 to the speech processing circuit 33 for providing the digital speech data. The microprocessor 45 is also bi-directionally coupled to the modem 35 over line 49 allowing for the receipt and generation of calls. The microprocessor 45 provides the central intelligence for the paystation telephone system 10 and includes a limited amount of on-chip memory 51. The microprocessor further provides control outputs to the power control 23, coin relay control 25 and voice network/call progress circuits 31, 41.

The microprocessor 45 is connected with several other circuits to operate the paystation telephone system 10. A read only memory (ROM) 53 is connected to the microprocessor 45 via line 54 and stores a boot program for initializing the microprocessor 45 in order to receive downloaded firmware. At least one keypad 55 for the paystation provides input signals over line 56 to the microprocessor 45. A credit card reader 59 and a coin chute circuit 61 provide input signals over lines 60 and 62, respectively, to the microprocessor 45. A system clock 57 is bi-directionally coupled over line 58 to the microprocessor 45 for providing time and date functions for the paystation 10.

In addition to the on-board memory 51 contained in the microprocessor 45, an additional random access memory (RAM) 63 is coupled to the microprocessor 45 over line 64. Software for the RAM memory 63 can be remotely downloaded from a host computer via the phone line 11 and modem 35 to enhance the versatility of the paystation telephone system 10. A battery back-up system 65 is provided which couples to the system clock 57 and the downloadable RAM memory 63. The back-up battery system 65 only serves to power the system clock 57 and the RAM memory 63 and does not provide any power to the other operational circuits within the paystation telephone system 10.

The size of the RAM memory 63 is sufficiently large, e.g. eight megabit, to store the operational firmware, voice data, system status flags, etc. for operation of the paystation telephone system 10. For example, an 8K × 8 block of memory space in RAM 63 can contain status words indicating the operational characteristics of the paystation. Further, another similar sized memory space can store the firmware for operating the microprocessor to carry out the paystation features.

A hook switch 67 provides inputs to the microprocessor via line 68 and to the power control circuit via line 90. The hook switch 67 detects whether the handset 39 is on or off its hook. When an off-hook condition is detected, a signal is sent to the power control circuit 23, which then activates or "wakes-up" the microprocessor 45. The microprocessor 45, once activated by the power central 23, reads the input signal from the hook switch 67 indicating the off hook condition and thus seizes a telephone line. The telephone line 11 is released after the microprocessor 45 receives an on-hook input from the hook switch 67. Similarly, the system clock 67 also provides an input 92 to the power control circuit 23 which can wake up the microprocessor 45.

A number of sensors, illustrated generally by sensor block 69, are connected to the microprocessor 45. The sensor block 69 includes a housing sensor for determining whether the upper housing has been removed, e.g. for maintenance work, a cash box sensor for determining whether the cash box is present within the paystation or has been removed, a collect/refund sensor for determining whether the central office has signaled the operation of the collect/refund relay within the paystation phone, a ring sensor to determine whether the paystation telephone is receiving an incoming call, a coin jam sensor to detect any jams that may occur in the coin chute, and a housing ground sensor to determine whether the paystation telephone housing is properly grounded.

The paystation telephone system 10 is controlled via the firmware stored in the RAM memory 63 to operate as either a regulated system or COCOT system. The microprocessor 45 determines the paystation's mode of operation via the programs stored in down-loadable RAM 63. The RAM memory 63 can be downloaded via the phone line 11 from a remote office using any computer. For example, a personal computer communicating with a COCOT station can download programs into the RAM memory 63 for controlling the operation of paystation telephone 10. The ability to download programs into the RAM memory 63 allows for remote changes, additions or deletions to the paystation features. In this manner, no labor and cost intensive technicians and field service calls are required.

As noted above, RAM memory 63 can be downloaded with a status block controlling the operational characteristics of the paystation. In this manner, the paystation telephone system 10 operates in either a coin line or COCOT mode simply by having the microprocessor 45 read a status bit loaded into the RAM memory 63. Therefore, no hardware changes are necessary to convert the paystation telephone system 10 from coin line to COCOT use.

Figure 2:
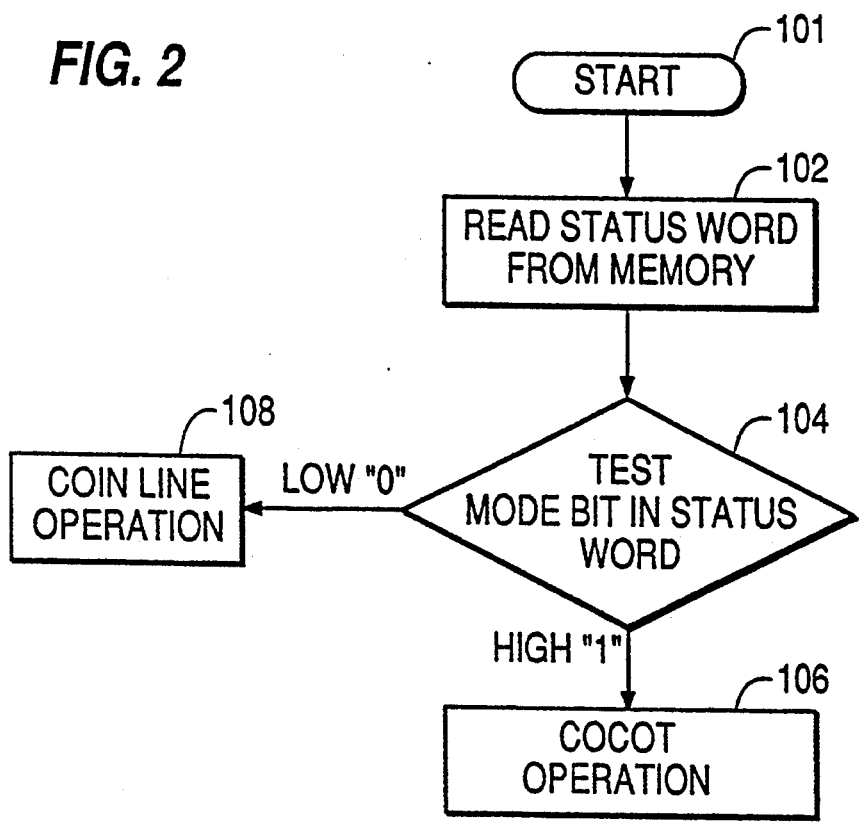
FIG. 2 is a flow chart illustrating the method for operating the paystation in either the COCOT or coin line modes.

A flow chart is provided in FIG. 2 illustrating the operation of the microprocessor 45 and the paystation telephone system 10 to determine whether the paystation is to function in a coin line or COCOT mode. The microprocessor 45 begins (step 101) operating whenever it is first powered up or whenever the handset 39 goes off-hook as detected by hook switch 67. The microprocessor 45 next reads a word from the memory space in RAM 63 containing the mode status flag for the paystation telephone system 10 (step 102). The microprocessor 45 then determines the setting of a mode bit (or set of bits) in the status word to determine the operating mode (either coin line or COCOT operation). For example, assuming a single mode bit is used, then a low potential or zero bit could indicate coin line operation and a high potential or one bit could indicate COCOT operation (step 104). This is shown in FIG. 2 wherein when the high or one bit is determined, the microprocessor 45 and paystation telephone system 10 operates in COCOT operation (step 106). When a zero bit is determined, then the microprocessor 45 and paystation telephone system 10 operate as a coin line system (step 108).

Figure 3:
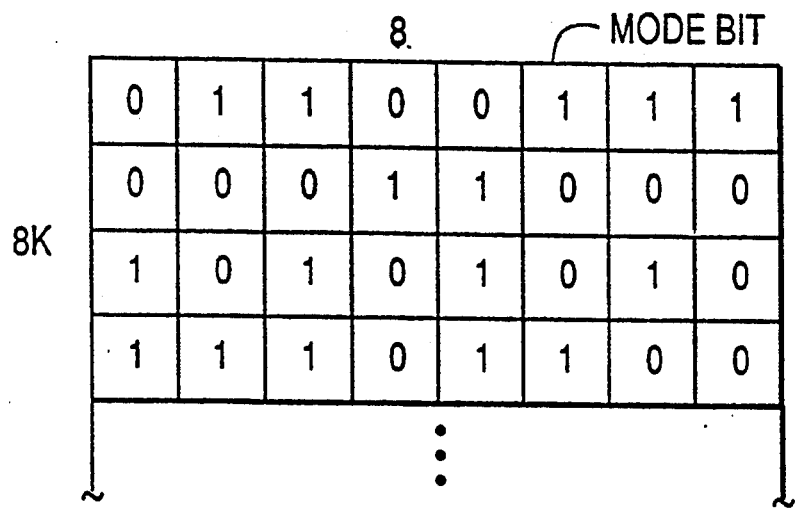
FIG. 3 is an example of a portion of the external RAM memory described with respect to FIG. 1.

FIG. 3 illustrates, by example, part of an 8k by 8 memory space containing the status flags for the paystation telephone system. As shown in the first word in the memory space, the seventh bit position is used to indicate the mode of operation. Because a one is located in this bit position, in accordance with FIG. 2, the paystation would be in COCOT mode.

Figure 4A:
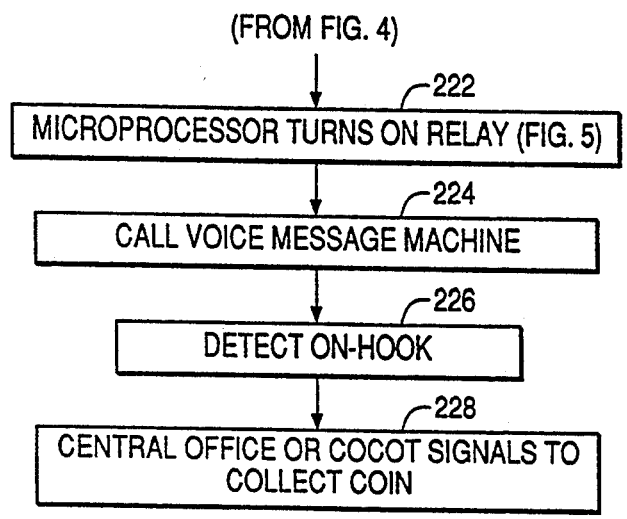

Referring to FIGS. 4 and 4a, there is shown a flow chart illustrating the operation of the combined paystation telephone system 10 allowing voice messages to be left for the called station when no answer or a busy signal is received from the called station. The program operates to insure coin collection from the calling party when the use of the voice message service is activated. The microprocessor 45 begins its operation (step 200) by detecting an off-hook status of the telephone handset 39 (step 202). Next, the microprocessor 45 detects whether any digits have been dialed (step 204) via keypad 55. The call progress status is then monitored (step 206) to determine whether the called party answers the call or whether a ringing or busy signal remains present. The operation of the call progress status performed in step 206 is carried out as more fully described in co-pending application Ser. No. 07/745,594 incorporated by reference above.

If the call is answered, then the paystation telephone system 10 continues with its normal operation (step 208). However, if the call progress status continues to detect a ringing or busy signal, then the voice message system may be activated (step 210). As noted above for determining whether the paystation is a coin line or COCOT station by reading a bit in a status word, similarly the voice message system is determined to be available or not by the microprocessor 45 likewise checking a status bit contained in the RAM memory 63. Assuming the voice message system is available, then the speech generating circuitry 33 outputs a voice message to the calling party asking the calling party to make a selection through the keypad (or by some other means such as depositing another coin) if the calling party desires to leave a message (step 212). If no selection is made, then the paystation resumes normal operation (step 208). However, if the designated keypad selection is made, e.g. the pound key could be selected, then the microprocessor operates to provide the voice message system.

Figure 5:
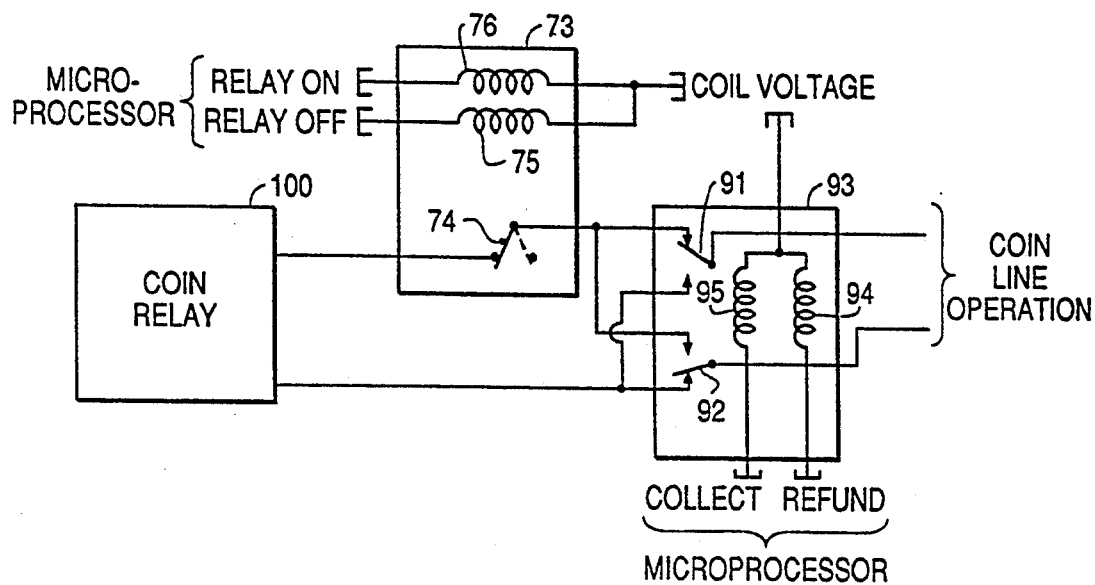
FIG. 5 is a schematic block diagram illustrating the operation of a coin inhibit relay.

In a coin line system, once the initial call is terminated without receiving an answer, the central office normally fires the coin relay by providing a coin disposal signal to refund the coin deposited by the calling party since no connection was made. However, if a voice message system is to be employed, then the firing of the coin relay must be prevented in order to collect the calling party's coin for the use of the voice message system. Therefore, a coin refund inhibit relay 73 is provided in circuit between the collect/return control relay 93 and the coin relay circuit 100 itself as shown in FIG. 5. As noted above, a more complete description of the operation of the coin relay 100 and collect/return control relay 93 is provided in co-pending application Ser. No. 07/740,576 incorporated by reference above. The coin refund inhibit relay 73, coupled in series between the collect/return relay 93 and the coin relay 100, includes a pair of control windings 75, 76. One end of each of windings 75, 76 is coupled in common to receive a coil energizing voltage. The other ends of control windings 75, 76 are respectively coupled to receive "relay off" and "relay on" signals from the microprocessor 45, to delineate the position of switch 74 in series with the coin relay 100. As shown in FIG. 5, switch 74 is closed so as to complete the circuit between the collect/return control relay 93 and coin relay 100 allowing for a firing of the coin relay 100. If the microprocessor 45, however, issues a relay off signal, then the switch 74 opens (as noted by the phantom line) to turn off the coin relay 100.

Referring back to FIG. 4, once the voice message system is selected (step 212), then for a coin line system, the microprocessor 25 turns off the coin relay 100 (step 214) as described above with respect to FIG. 5. Next, the system clock 57 is set to seize a phone line 11 once the microprocessor hangs up or terminates the initial call by the calling party (step 216) in order to then dial the voice message system. Thus, after the microprocessor hangs up the phone line 11 (step 218), the clock 57 signals the power control 23 via line 92, thus activating the microprocessor 45 to seize the phone line 11 again (step 220). In the coin line operating mode, once the microprocessor 45 terminated the original call (step 218), the central office would signal the coin relay 100, via a coin disposal signal, to fire thus refunding the caller's money. However, because the microprocessor turned off the coin relay 100 in step 214, the coin deposited by the caller remains in the telephone to be collected once the caller hangs up after leaving his voice message. Therefore, after the microprocessor 45 seizes a new phone line (step 220), then the coin relay 100 is signaled via coin refund inhibit relay 73 to again turn on (step 222). If the paystation telephone system 10 is operating in the COCOT mode, as determined by the operation in FIGS. 2 and 3, then steps 214 and 222 are not necessary.

Next, the microprocessor 45 dials the voice message system (step 224) and the caller may then leave his message. Once the handset 39 is detected to be on-hook again (step 226), then either the central office in a coin line system passes a fire signal through collect/return control relay 93 or, the COCOT paystation itself signals the collect/return control relay 93 to fire, thus collecting the coin (step 228).

Figure 6:
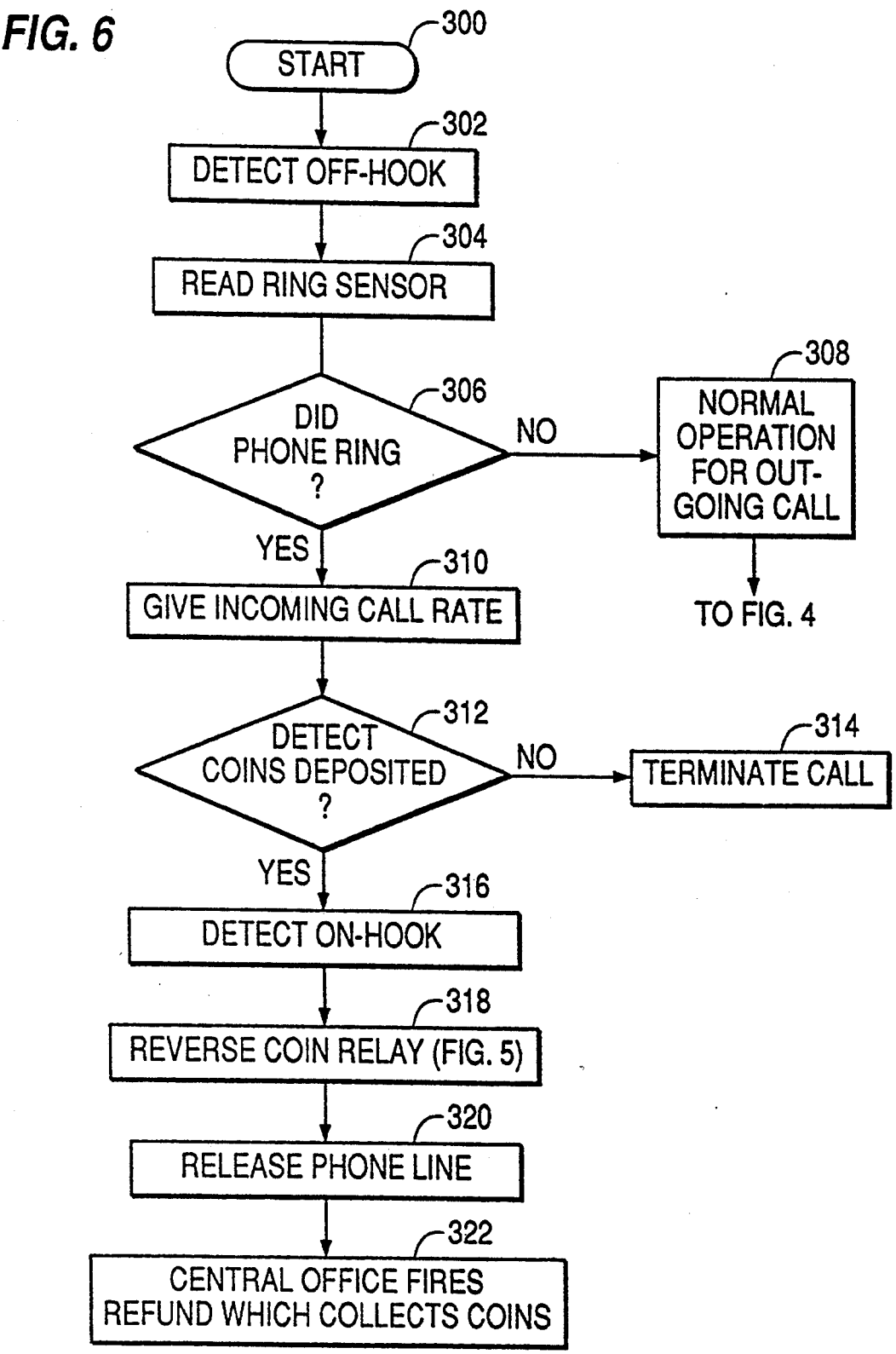
FIG. 6 is a flow chart illustrating the method for operating the paystation to charge for incoming telephone calls.

The combined coin line and COCOT paystation telephone system 10 of the present invention has the further advantage of allowing coin collection for all incoming phone calls made to a paystation. In COCOT operation, the paystation itself determines whether to collect any coins by providing a collect signal from the microprocessor 45 to the collect/refund control relay 93 as shown in FIG. 5. However, because the paystation telephone system will receive a refund signal from a central office when operating in the coin line mode after the termination of an incoming call, the microprocessor 45 must control the collect/refund control relay 93 so as to reverse the relay contacts to collect the coins in response to a central office refund signal. This is accomplished according to the flow chart shown in FIG. 6 wherein the microprocessor begins (step 300) by detecting the off-hook condition of the handset 39 (step 302) via the hook switch 67. After detecting the off-hook condition, the microprocessor 45 reads the input from the ring sensor 69 coupled to the microprocessor 45 (step 304). If the ring sensor 69 indicates that the phone was not ringing prior to detecting the off-hook condition of the handset 39, then the operation of the paystation progresses normally for an outgoing call (step 308) by reverting to the check of the call progress status indicated in FIG. 4. However, if the ring sensor 69 detects that the phone was ringing, then the microprocessor outputs a voice message through speech processing circuitry 33 to the answering party requiring that money be deposited (step 310). The amount of money requested is determined by the microprocessor 45 looking up the incoming call rate from RAM memory 63. The microprocessor 45 then detects whether the proper amount of money was deposited (step 312) by reading the signal input from the coin chute 61. If no coins or insufficient funds were deposited, then the call is terminated (step 314). If the answering party deposited the correct number of coins, then the microprocessor 45 waits to detect an on hook condition of the handset 39 (step 316), indicating that the phone conversation has concluded. Once an on-hook condition is detected via hook switch 67, the microprocessor 45 provides a collect signal to the collect/refund control relay 93 as shown in FIG. 5 (step 318). The operation of the collect/refund control relay 93 as well as the coin relay 100 is described in greater detail in co-pending application Ser. No. 07/740,570 incorporated by reference above. After reversing the coin relay (step 318), the microprocessor 45 releases the phone line 11 (step 320). Once the phone line 11 is released, then the central office, in accordance with its operating procedure, will fire a refund signal to the collect/refund control relay 93 as shown in FIG. 5. However, because the microprocessor 45 has reversed the relay contacts, the coin relay 100 will actually collect the coins deposited (step 322). In this manner, a coin line paystation is operable to collect funds for incoming calls.

Another advantageous feature of the combined paystation telephone system 10 operating in the coin line mode is to detect and prevent coin tone fraud, i.e. the use of externally generated coin tones for placing long distance calls in lieu of actually depositing coins into the paystation. In normal operation, whenever a long distance or "one-plus" call (the digit "1" plus the remaining number for a long distance call) is dialed directly, an automated coin toll service (ACTS), or the like, associated with the coin line operator is coupled to the phone line to give the cost of the one-plus call and to detect coin tones indicating the deposit of money into the paystation. Standard coin tones are set at 1700 Hz and 2200 Hz and must be detected by the ACTS system for a certain period of time in order for the system to accurately identify the deposit, i.e. to registering the coin tone, thus allowing the phone call to be connected. Normally, these coin tones are generated by the microprocessor 45 through speech circuit 33 once coins are detected in the coin chute 61. However, it is possible for a caller to generate the required coin tone frequencies through the handset 39 which could then be detected over the phone line 11 by the ACTS system to fraudulently allow a one-plus telephone call. The paystation telephone system of the present invention prevents this type of coin tone fraud by monitoring the call progress or answer supervision circuitry 41 to detect the presence of coin tones input through the handset 39. If coin tones are detected by the microprocessor 45, the microprocessor signals the voice network 31 to mute the microphone contained within the handset 39 for a preset time to disrupt the coin tone such that the ACTS system will not recognize it.

Figure 7:
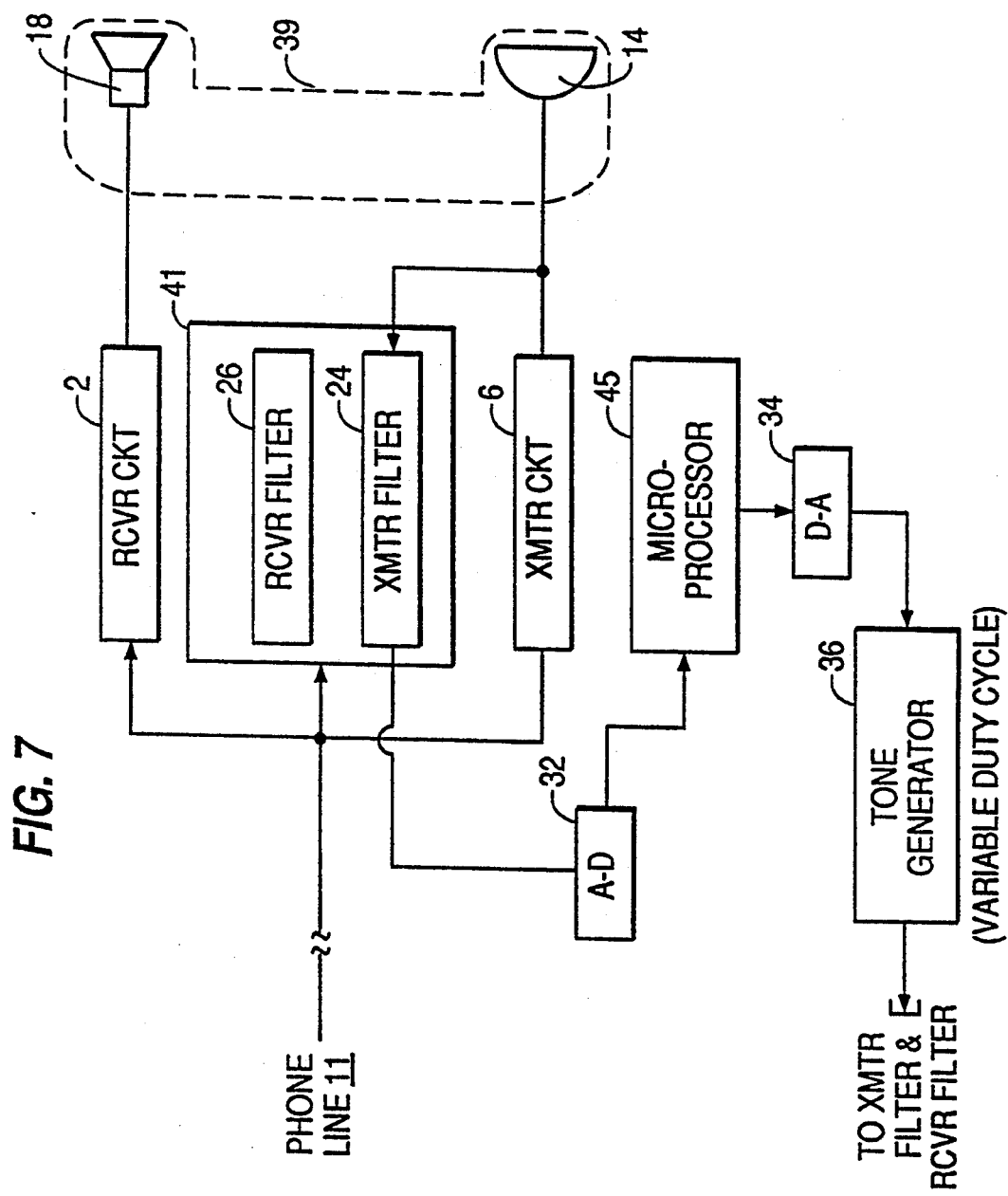
FIG. 7 is a schematic block diagram of the call progress circuitry used in conjunction with various other components of the paystation telephone system.

Referring to FIG. 7, the call progress circuit 41 is shown coupled to each of a conventional paystation transmitter circuit 6 and telephone line receiver circuit 2. Each of transmitter circuit 6 and telephone line receiver circuit 2 is coupled in a conventional manner to telephone line 11. Transmitter circuit 6 receives user voice signals by way of a microphone 14 in the handset 39. Handset 39 also includes an earpiece speaker element 18 to which telephone line receiver circuit 2 is coupled.

The call progress circuitry 41 includes a discriminator comprised of a first tunable bandpass receiver filter 26 coupled in circuit with the phone line 11, and a second tunable bandpass transmitter filter 24 connected to the transmitter circuit 6. Each of bandpass filters 24 and 26 preferably comprise an adjustable-Q bandpass filter formed of a plurality of cascaded filter stages inter-coupled to form an eighth order tunable audio bandpass filter. Tuning (Q-adjustment) of each of the bandpass filters is accomplished by controlling the time constant of the respective stages of the filter, in particular by controlling the value of a variable resistor (not shown) through which the transfer function of the respective filter stage is defined. A more detailed description of the operation of the bandpass filters as well as the call progress circuit 41 is given in copending application Ser. No. 07/745,594 incorporated by reference above.

As shown in FIG. 7, a constant frequency, variable duty cycle, triangular wave signal supplied by a tone generator 36, under the control of the paystation's microprocessor 45 is input to the transmitter filter 24 for controlling its operation. Depending upon the setting of the variable duty cycle output from the tone generator 36, the receiver and transmitter filters 26, 24 are tuned to a certain frequency. Hence, the microprocessor 45 can signal the tone generator 36 to output a 1700 or 2200 Hz signal corresponding to the coin tones. Thus, any fraudulent generation of these frequencies through the handset microphone 14 can be detected by the microprocessor 45 by use of the transmitter filter 24.

Figure 8:
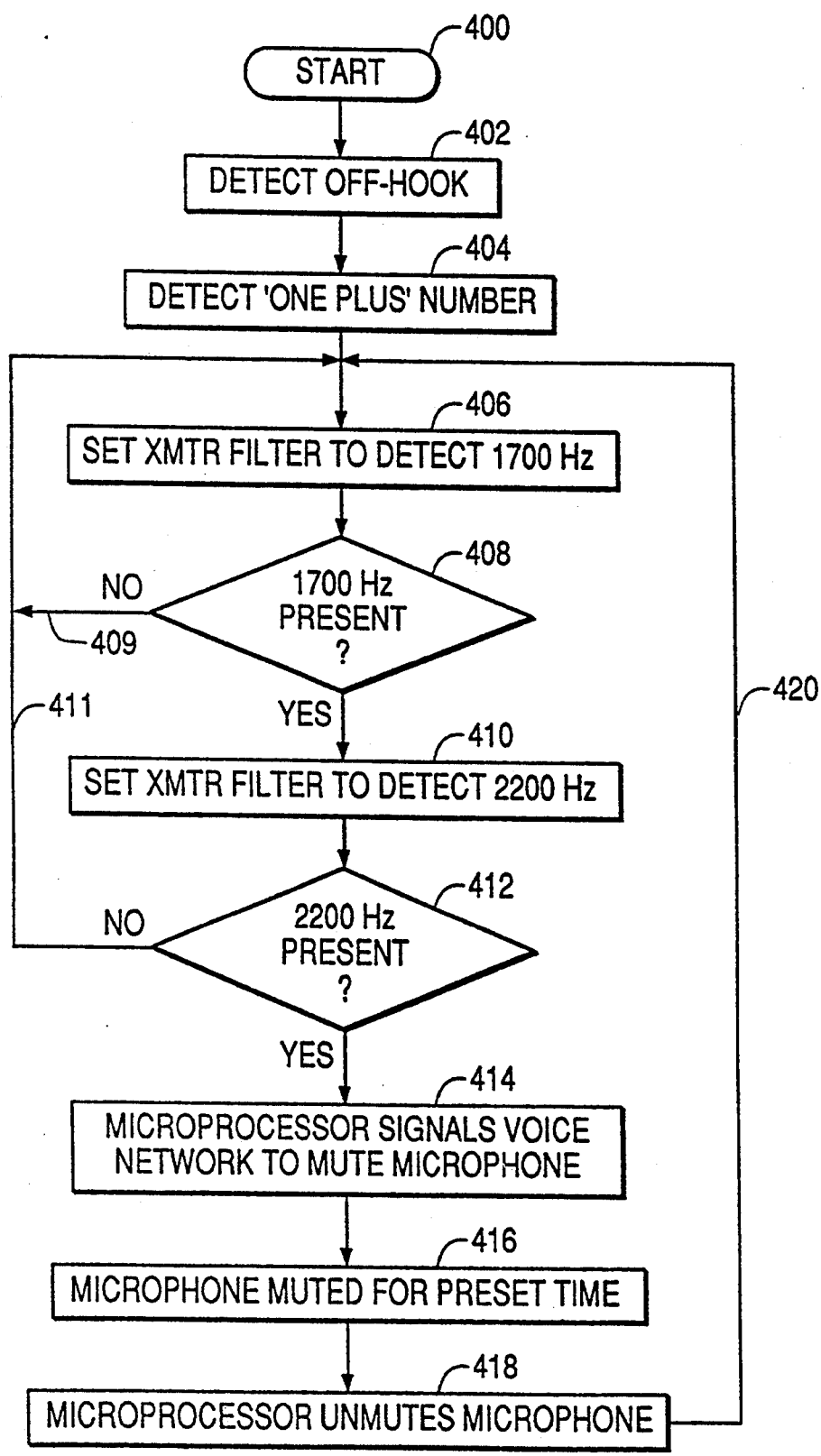
FIG. 8 is a flow chart illustrating the method for operating the paystation to prevent coin tone fraud.

Referring to the flow chart shown in FIG. 8, the programmable operation of the microprocessor 45 in the paystation telephone system 10 to prevent coin tone fraud is illustrated. The microprocessor begins (step 400) by detecting the off-hook condition of the handset 39 (step 402) via hook switch 67. Next, the microprocessor detects whether a one-plus, i.e. a long distance call, is being placed (step 404) via the input from keypad 55.

If the microprocessor determines that a one-plus call is being attempted, then it signals the tone generator 36 (FIG. 7) to output a duty cycle pre-set for the transmit filter 24 to detect the first coin tone frequency of 1700 Hz (step 406). The call progress circuit 41 and specifically the transmit filter 24 contained therein is then operable to pass the 1700 Hz coin tone frequency input through the microphone 14 to an A-D converter 32 which provides a digital signal detected by the microprocessor 45 (FIG. 7). If the 1700 Hz signal is not detected (step 408), then the operation loops back prior to step 406 as indicated via line 409. However, if a 1700 Hz signal passes through the transmit filter 24 and is detected by the microprocessor 45, then the microprocessor sets the transmit filter 24 to pass a 2200 Hz signal (step 410) via the tone generator 36 as discussed above for the 1700 Hz frequency.

Next, the microprocessor 45 detects whether the 2200 Hz signal is present (step 412) and, if not, again loops back prior to step 406 as shown via line 411. However, if the 2200 Hz signal is detected, then the microprocessor 45 signals the voice network 31 to mute the microphone 14 contained in the handset 39 (step 414). The microphone 14 is thus muted for a pre-set time (step 416) in order to disrupt the characteristics of the tone that are being detected by the automated coin toll service associated with the coin line. After the pre-set time expires, e.g., approximately 50 ms, the microprocessor 45 unmutes the microphone (step 418) and again sets the transmitter filter to detect the 1700 Hz signal as shown via line 420 in FIG. 8 to continue the monitoring operation.

The coin tone fraud prevention program described with respect to FIGS. 7 and 8 is not necessary for COCOT operation because a COCOT paystation does not require the use of the automated coin toll service but rather merely detects the presence of coins via the microprocessor's connection with the coin chute 61. For COCOT operation, the calling rates, i.e. the amount the call costs, are pre-stored in a look up table (LUT) in the paystation. Thus, the ACTS system is not necessary for COCOT operation as the microprocessor itself simply looks up the calling rate in the LUT and provides a voice message to the paystation user indicating the cost of the call.

The paystation telephone system 10 further includes a program for detecting whether the paystation housing case is properly grounded to prevent AC power from charging the case and posing a danger to prospective callers. Conventionally, the housing case for a paystation telephone is grounded such that if AC power accidentally charges the telephone line, and hence the housing case, then the case is properly grounded to prevent shock to a prospective caller.

Figure 9:
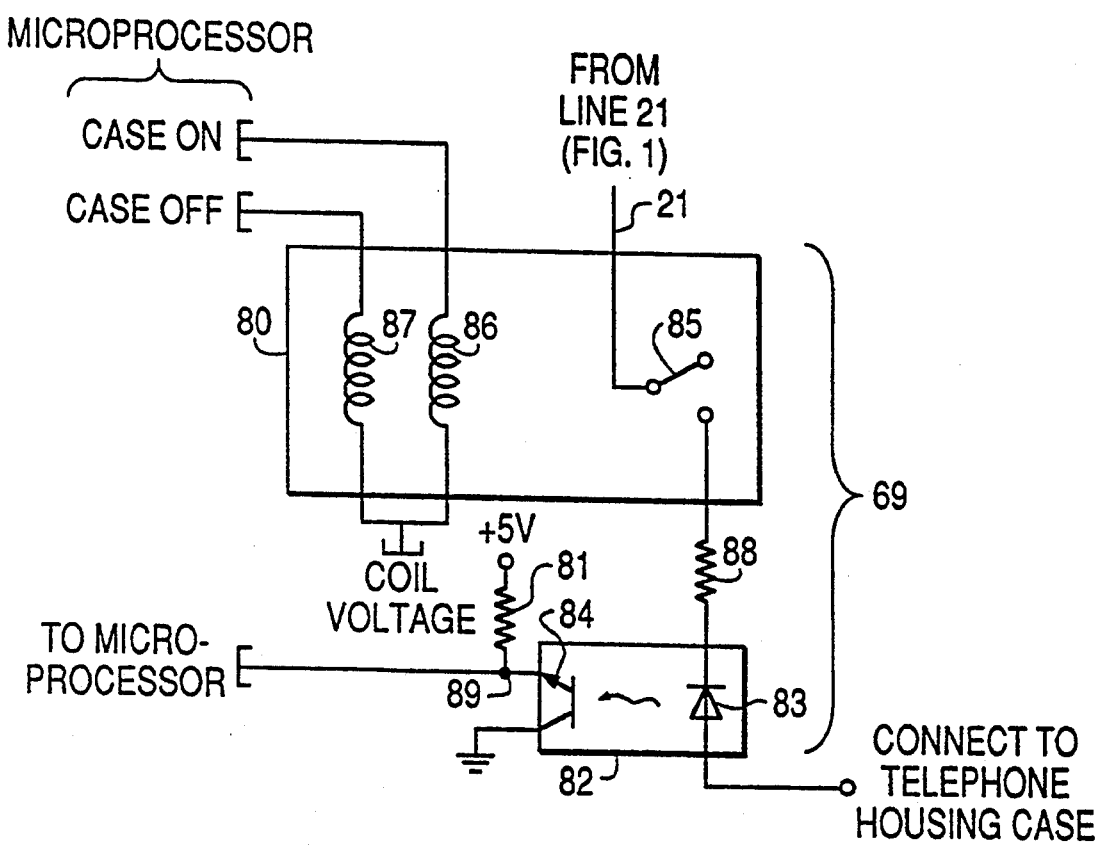
FIG. 9 is a schematic block diagram of the housing case ground sensor of FIG. 1.

Referring to FIG. 9, there is shown a housing ground circuit for the sensor block 69 in FIG. 1. The housing ground circuit includes a housing detect relay 80 containing a switch contact 85 having one end coupled to the power and audio line 21 from node 19 of the full wave rectifier 15 illustrated in FIG. 1. The other end of the switch contact 85 is provided through a resistor 88 to an isolator circuit 82 containing therein a diode 83 coupled at one end to the resistor 88, and at its other end to the telephone housing case which in turn should be properly ground. A transistor 84 forms the other part of the isolating circuit 82 and is operatively arranged to receive radiated emissions from the diode 83, e.g. a light emitting diode (LED), in order to bias the transistor base 84, thus switching it on. The emitter of transistor 84 is coupled to ground and the collector is coupled through a resistor to a five (5) volt power supply. An input to the microprocessor 45 is also coupled to the collector of transistor 84.

The housing ground detect relay 80 further includes two coils 86 and 87 normally coupled at one end to the coil voltage and at their other ends to case-on and case-off signal input lines from the microprocessor 45, respectively.

Figure 10:
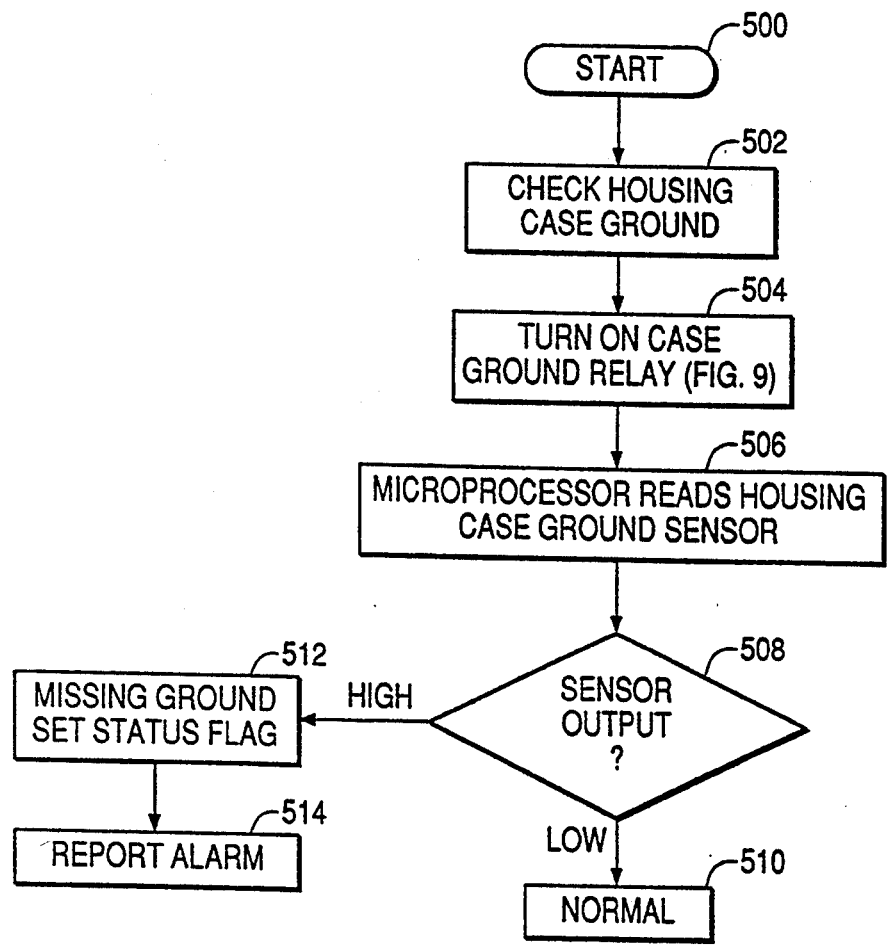
FIG. 10 is a flow chart illustrating the method for operating the paystation to detect whether the housing case is grounded.

FIG. 10 is a flow chart illustrating the operating steps of the microprocessor 45 for determining whether the housing case is properly ground. Microprocessor 45 begins (step 500) by attempting a check of the housing case ground (step 502). This check can be initiated, for example, by operating a diagnostic check of the paystation telephone system and/or whenever the hook switch 67 detects that the handset 39 has gone off-hook. Once a check of the housing case ground is underway, the microprocessor 45 signals the case-on input to the housing ground detect relay 80 which closes switch 85. Power then flows from line 21 through the resistor 88, diode 83, and the telephone housing case if the ground connection is properly installed. If the housing case is properly grounded, then the current flow through diode 83 produces an optical transmission which biases transistor 84 on. The 5 volt power supply then flows through resistor 81 and transistor 84 to ground, thus lowering the potential at node 89 which is detected by the microprocessor 45. If, however, the housing case is not properly grounded, then no current flows through line 21 and the transistor 84 remains off such that node 89 is held high. Referring back to the flow chart of FIG. 10, the microprocessor 45 reads the housing case ground sensor via the potential detected at node 89 (step 506). If the sensor output is determined to be low, then the telephone housing case is properly grounded (steps 508 and 510). If, however, the sensor output is high, then the microprocessor 45 determines that ground is missing and a status flag contained in the status memory space in RAM 63 is set (step 512). Upon detecting the status flag being set, the microprocessor 45 reports an alarm signal via the modem 35 (step 514).

The paystation telephone system 10 of the present invention further provides a program for collecting phone charges for local calls which extend beyond a predetermined time limit, e.g. three minutes. The paystation telephone system 10 determines when local overtime charges are to be applied based on the actual connect time between the calling and called parties. The microprocessor 45 operates to start a local overtime timer once the called party answers the phone rather than, as was previously done, based on a simple time delay, e.g. 15-20 seconds after the calling party places the call. The present invention has the advantage of accurately calculating the actual connect time between the parties. The simple delay used by prior paystations could not account for any extended ringing duration which shortened the amount of connect time or an immediate answer by the calling party which would extend the actual connect time beyond the preset limit.

Referring to FIG. 11, a flow chart is provided illustrating the operation of the microprocessor 45 in the paystation telephone system 10. The microprocessor begins (step 600) by detecting when the handset 39 goes off hook (step 602) via the hook switch 67. The microprocessor 45 next detects the dialed digits (step 604) from the keypad 55 which determines whether a local call is being placed.

Next, the call progress status (step 606) is monitored as discussed previously with respect to FIG. 4 and as described in greater detail in co-pending application Ser. No. 07/745,594 incorporated by reference above. If either a continued ringing or busy signal is present, then the microprocessor 45 checks a status bit in the RAM memory 63 to determine whether the voice message system is on (step 609). If it is not, then the call progress status continues to be monitored (as shown via line 607). If the voice message system is on, then the microprocessor continues to operate in accordance with the flow chart shown in FIG. 4.

If the call progress circuit 41 determines that the called party has answered the telephone, then the microprocessor 45 starts a local overtime timer (step 608). The local overtime timer is set to time-out after a predetermined time limit set via the status flags contained in the RAM memory 63. Once the time expires (step 610), then the microprocessor 45 outputs a voice message through speech circuitry 33 to the calling party requesting additional money (step 612). The microprocessor 45 then monitors the coin chute input 62 to determine whether any coins have been deposited (step 614). If no coins are deposited, then the call is terminated (step 616). However, if further coins are deposited, then the local overtime timer is reset as indicated via line 615 for the next time period provided.

The integrated paystation telephone system 10 also includes programming and circuitry for detecting whether the paystation's cash box (where the deposited coins are stored), is present in the paystation and prohibiting long distance and local calls if the cash box is missing. This feature allows the microprocessor 45 to disable the coin tone output provided over the phone line 11 whenever the cash box is not present so as to avoid fraudulent long distance telephone calls made by a caller placing coins into the phone and then recollecting them after the coin tones are generated. For example, if the cash box is stolen from the phone, then the paystation is left with an exposed or accessible area, into which any further deposited coins will be dropped. Thus, a caller can deposit coins to generate the coin tones necessary to make a long distance call and then recover the coins once they pass through the telephone. Similarly, local calls are allowed to be placed when the microprocessor closes a circuit path from the telephone line tip to ground. This circuit path is closed when the initial rate has been deposited into the coin chute. The central office detects the closed circuit path, thus allowing the call to be made. Therefore, fraudulent calls can be placed by depositing coins, thus closing the circuit path, which are then recovered because the cash box is missing. The present invention provides for keeping open the circuit path when the cash box is missing so that even local calls cannot be placed as the central office will not detect the initial rate being met.

Figure 12:
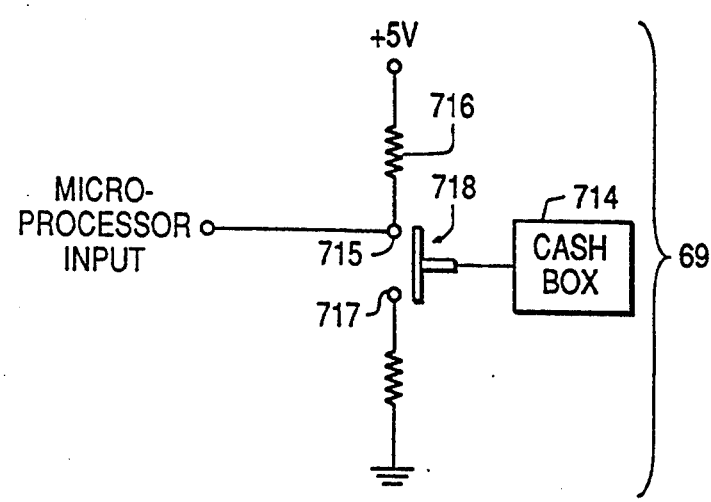
FIG. 12 is a schematic block diagram of the cash box sensor according to the present invention.
Figure 13:
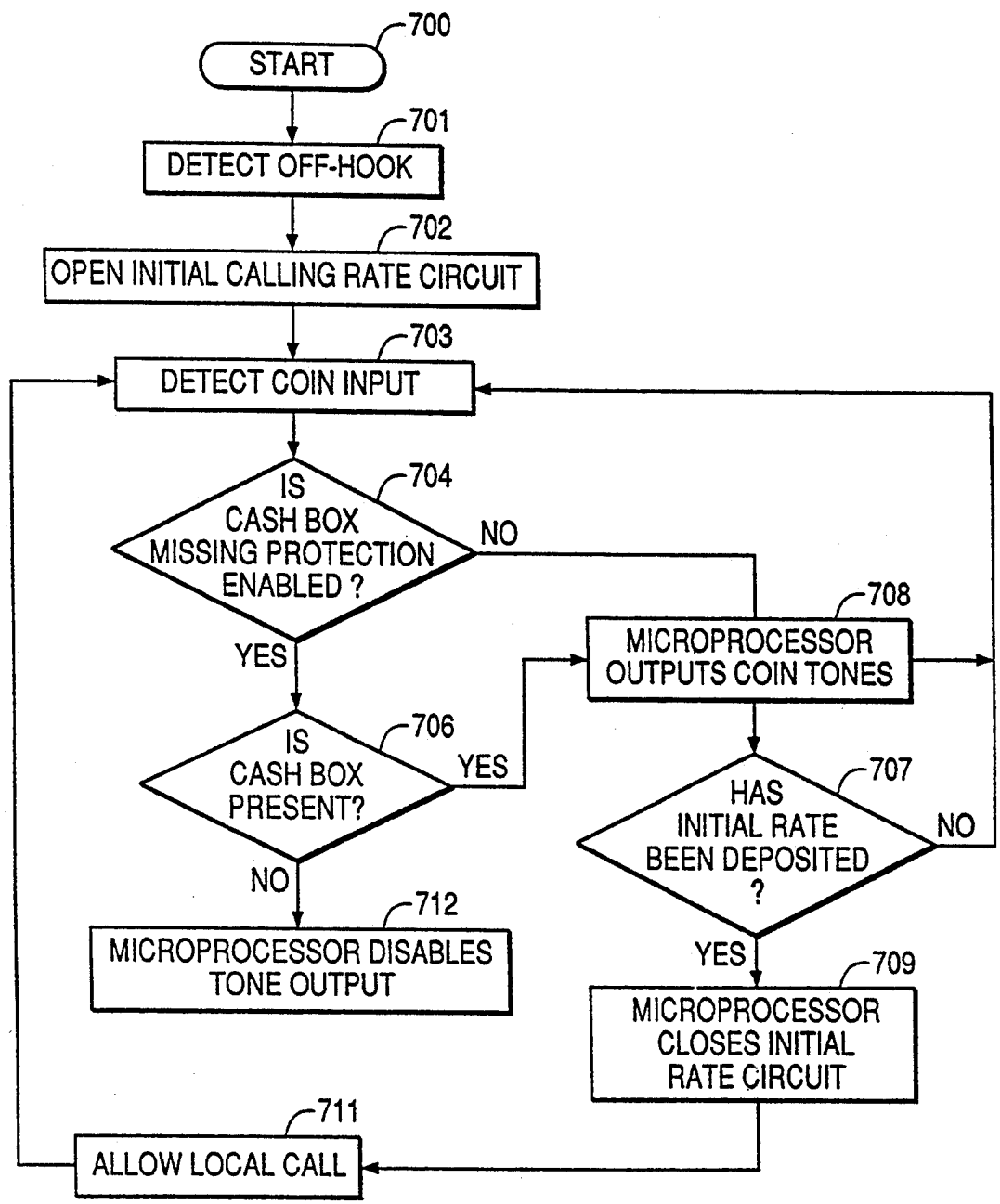
FIG. 13 is a flow chart illustrating the method of operating the paystation to inhibit long distance calls when the cash box is not present.

Referring to FIG. 12, there is shown a schematic circuit for a cash box sensor 69 having an input coupled to the microprocessor 45. A cash box 714 is coupled to a push-button switch 718 such that when the cash box 714 is present in the paystation, the switch 718 is open across terminals 715 and 717 thus no current conducts through resistor 716 to ground and this keeps the microprocessor input node 715 high. However, if the cash box 714 is removed, then switch 718 closes and the microprocessor input becomes grounded and is thus lowered to ground potential. The flow chart shown in FIG. 13 illustrates the programmable operation of the microprocessor 45, to detect the presence of the cash box 714. The microprocessor 45 begins (step 700) by detecting an off-hook condition (step 701) and opening the initial calling rate circuit path (step 702). Next, the microprocessor detects whether any coins have been input (step 703) via the coin chute 61 coupled thereto. Then, the microprocessor 45 determines whether the cash box missing protection feature is available on the paystation (step 704). If it is, then the microprocessor 45 reads the cash box sensor input, as described with respect to FIG. 12, to determine whether the cash box is present (step 706). If the cash box is present (step 706), then the microprocessor 45 outputs the coin tone frequencies for a long distance call via the speech circuit 33 over the phone line to be received by the coin line ACTS service (step 708). Thus, the paystation telephone system continues its normal operation. However, if the cash box is not present, then the microprocessor 45 disables the coin tone output and prohibits the tones from being placed on the phone line 11 via the speech generating circuitry 33 (step 712). Also, for local calls, if the cash box is not present (step 706), then the initial calling rate circuit will never be closed.

It can readily be seen that whenever the cash box is not present, then the microprocessor 45 prohibits any one-plus calls from being placed. The sensing of the cash box's presence is performed whenever a coin is deposited as indicated by the coin chute input 62 to the microprocessor 45.

If the cash box missing protection feature is not enabled (step 704), then coin tones will be generated (step 708.) It is, however, sometimes desirable to omit the protection feature when it is determined that the paystation user may cause greater damage to the paystation if his call cannot be placed.

For local calls when the cash box is present, the microprocessor 45 checks whether the initial rate has been deposited (step 707). If not, then it continues to wait for coins to be deposited (step 703). If the initial rate has been deposited, then the microprocessor 45 closes the circuit path (step 709) thus allowing the call to be placed (step 711) and then waits for further coins to be deposited (step 703). In this manner, if the cash box is not present, then the circuit path is never closed (as by step 709) thus also inhibiting local calls.

Figure 14A:
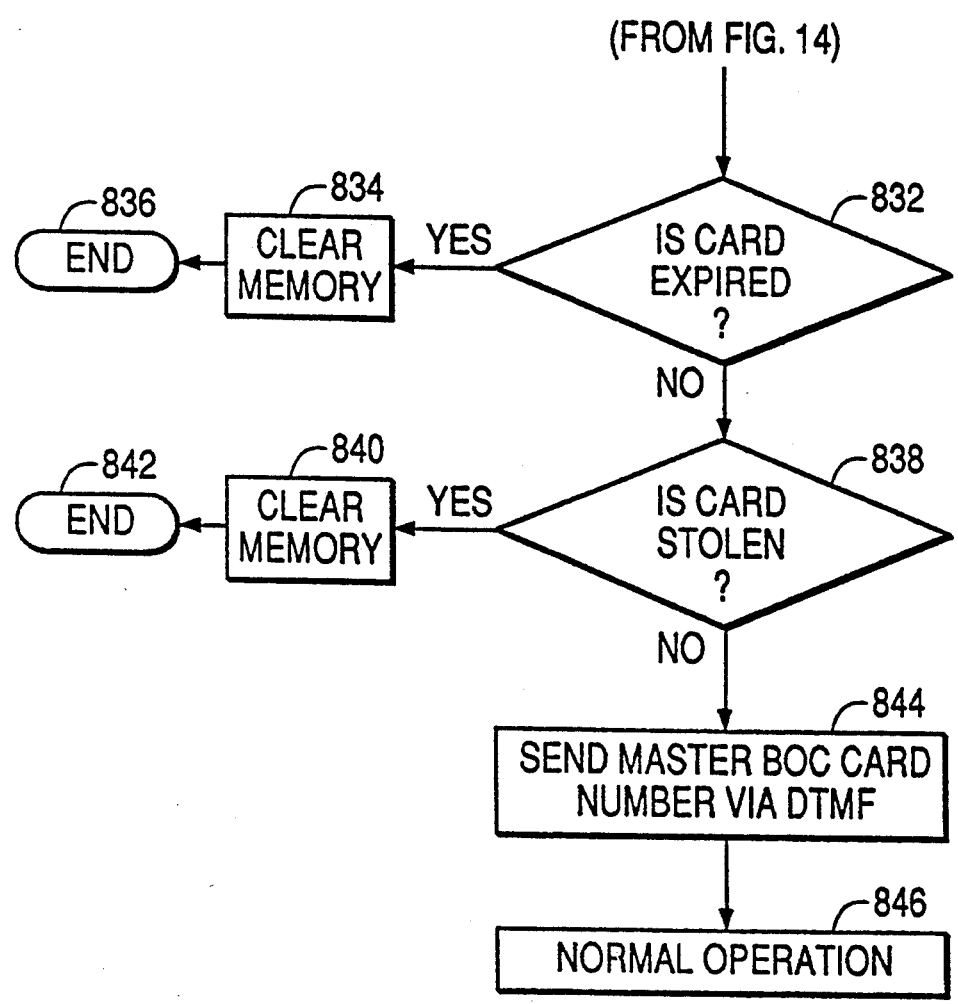

The paystation telephone system 10 further provides the versatility to accept any pre programmed bank card, credit card, gas card, or the like, for placing calling card or credit card, i.e. 'zero-plus' calls. Currently, the Bell operating companies regulated line system only allows the use of their own or a related calling card to place zero-plus calls. The present invention allows a COCOT or regulated paystation owner to program the paystation to accept any type of credit or bank card for use over a regulated or business line. This is achieved by storing a look-up table of valid/allowed card numbers in the RAM memory 63 for access by the microprocessor 45 during operation. Because the RAM memory 63 can be downloaded at any time with new or different card numbers, the number of allowed cards can be increased or decreased without requiring a field service call. FIGS. 14 and 14a provide a flow chart illustrating an example of the operation of the microprocessor 45 in the paystation telephone system 10 to accept various magnetically encoded cards in a Bell operating company (BOC) coin line or business line system. The microprocessor begins (step 800) by detecting the off-hook condition of the handset 39 (step 802) via hook switch 67. The microprocessor 45 next detects when the magnetic stripe of a bank or credit card has been "swiped" through the credit card reader 59 (step 804). The microprocessor 45 receives the credit card reader input over line 60 and stores the card data in its memory 63 (step 806). Next, the microprocessor detects the dialed digits (step 808) from the keypad 55 and then determines whether the phone number is a zero-plus number, i.e. a calling card or credit card call (step 810). If it is not, then the microprocessor clears the card number from its memory (step 812) and ends the card operation (step 814).

If the microprocessor 45 determines the call to be a zero-plus number, then the call progress circuitry 41 including its call progress filters are used to detect a central office originating line tone, i.e. the "bong" tone heard prior to entering a calling card number. Once the bong tone is received (step 816), the microprocessor 45 determines whether the card number is for a BOC card (step 818). If it is a BOC card, the card number is sent over the phone line by generating DTMF signals through the speech processing circuitry 33. Once the card number has been sent, the microprocessor 45 clears the card number from its memory (step 822) and the card operation ends (step 824).

If the microprocessor 45 determines that the card number is not for a BOC card, then it checks the card number against a look-up table storing the valid/allowed card numbers for the particular paystation. For example, four thousand series numbers are reserved for Visa cards. Thus, if the paystation telephone system 10 excepts Visa cards, the look-up table will be loaded with four thousand series numbers for comparison with the series on the card number stored in the memory 63 (step 826). If the card is not valid/allowed, then the card number is cleared from the memory (step 828) and the card operation ends (step 830).

Once the card is determined to be valid/allowed (step 826), then the expiration date of the card is checked (step 832) by the microprocessor 45. If the card has expired, then the card number is again cleared from memory (step 834) and the card operation ends (step 836). The microprocessor 45 determines whether the card has expired by comparing its coded expiration date with the date kept by the system clock 57.

If the card has not expired, then the microprocessor 45 checks the card number to see whether the card has been reported stolen (step 838). This is accomplished by comparing the card number with a list of stolen card numbers stored in the memory. Again, if the card number matches one on the stolen card list, then the card number is cleared from the memory (step 840) and the card operation ends (step 842).

Once these authorization steps, i.e. steps 810, 818, 826, 832, and 838, have been successfully performed, then the microprocessor 45 outputs a master BOC card number (one stored in the paystation itself) which is specific to the particular paystation telephone (or to a group of paystation telephones) by generating a DTMF signal through the speech processing circuitry 33 (step 844). Once the master BOC card number has been sent, the paystation telephone system continues with its normal operation (step 846).

Figure 15:
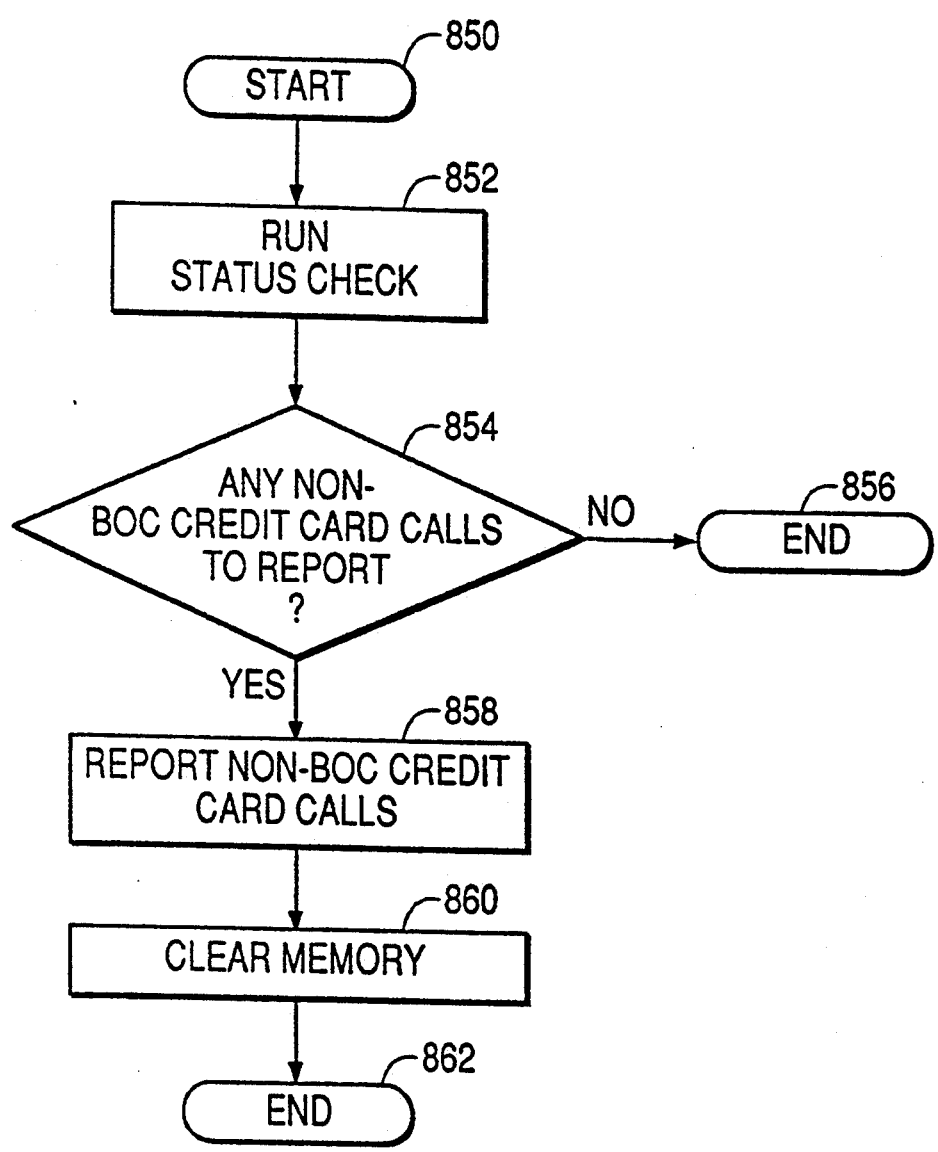
FIG. 15 is a flow chart illustrating the method of operating the paystation to report any non-coin line or business line authorized cards used to place a telephone call.

Referring to the flow chart illustrated in FIG. 15, there is shown the operation of the paystation telephone system 10 for reporting out and billing any non-BOC calls placed pursuant to the operation in FIGS. 14 and 14a. The microprocessor begins (step 850) at a pre-set time determined by the system clock 57, e.g. once per day, once every other day, etc. The microprocessor 45 begins by running a status check (step 852) where it determines whether any non-BOC calls have been placed that need to be reported and billed (step 854). If there have been none, this portion of the status check ends (step 856). However, if non-BOC calls have been placed, then the microprocessor 45 dials a billing computer using modem 35 to report the card numbers stored in its memory 63 (step 858). Along with the card numbers, the microprocessor reports other pertinent information concerning the call such as start date and time, duration of call, the number dialed, the type of call (incoming, outgoing, voice message, etc.), how the call was terminated (hang-up, insufficient funds, etc.), call progress results, etc. Once the reporting is finished, the microprocessor 45 clears the card numbers from its memory (step 860) which completes the reporting operation (step 862).

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. In a paystation telephone system, the improvement comprising:
   first means for allowing the operation of the paystation telephone system as a customer-owned, coin operated telephone (COCOT) connected to a telephone line ring/tip pair; and
   second means for allowing the operation of the paystation telephone system as a regulated line telephone connected to said telephone line ring/tip pair and a ground line from a central office, said first and second means being integrated together in the paystation telephone system.

2. An improvement according to claim 1, wherein the first and second means include:
   a microprocessor controlling the paystation telephone system;
   a coin relay control circuit operating a coin relay for collecting or returning coins deposited by a paystation user in response to both microprocessor generated firing signals and central office generated firing signals, the coin relay control circuit receiving power from the telephone line ring/tip pair; and
   call progress circuitry, coupled with the microprocessor, monitoring audio signals applied to the telephone line ring/tip pair from both a called station and from the paystation user.

3. For use in a customer owned coin operated telephone (COCOT) system having a business line and in a regulated system having a regulated line, a paystation telephone, comprising:
   a microprocessor connecting with one of the business line and the regulated line through audio signal processing circuitry;
   a memory coupled to said microprocessor; and a downloading circuit for remotely downloading firmware for said microprocessor into said memory via said one line wherein said microprocessor operates in accordance with the firmware for controlling the paystation telephone in the COCOT or regulated line system.

4. A paystation telephone system allowing audio signals from a paystation user to be applied through a handset to a telephone line coupled to the paystation telephone system, comprising:

a microprocessor controlling the operation of the paystation telephone system in two modes: as a customer owned coin operated telephone (COCOT) when coupled to a business telephone line and as a regulated telephone having a central office when coupled to a regulated telephone line;

a memory coupled to the microprocessor for storing status and program information for the paystation;

a power control circuit receiving a power and audio signal from the telephone line;

a coin relay control circuit operating a coin relay for collecting or returning coins deposited by the paystation user in response to both microprocessor generated firing signals and central office generated firing signals, the coin relay control circuit receiving power from the power control circuit;

audio signal processing circuitry connected in circuit with the power control circuit and the microprocessor and including a speech generating circuit and a modem;

a voice network connecting the audio signal from the power control circuit to the handset;

call progress circuitry connected to the voice network for monitoring the audio signals applied to the telephone line from both a called station and from the paystation user through the handset;

wherein the microprocessor provides control signals to the power control circuit for switching the power and audio signal output, to the coin relay control circuit for either collecting or returning the coin, and to the voice network for selectively muting a transmit microphone in the handset, and for controlling the operation of the call progress circuit; and wherein the status information in the memory is read by the microprocessor indicating the mode of operation.

5. A paystation telephone system according to claim 4 wherein the paystation telephone system is remotely configured from a host computer which downloads the status and program information into the memory.

6. A paystation telephone system according to claim 4, further comprising:

a read only memory circuit storing a boot program to initialize operation of the microprocessor;

a keypad providing keypad inputs to the microprocessor signalling digits dialed on the keypad;

a system clock bi-directionally coupling with the microprocessor providing time and date information;

a hook switch detector providing hook condition signals to the microprocessor indicating whether the handset is on or off hook;

a coin chute circuit coupling to the microprocessor for signalling the receipt of coins from the paystation user; and a plurality of sensors providing sensor inputs to the microprocessor for monitoring various conditions of the paystation telephone system.

7. A paystation telephone system according to claim 6, still further comprising:

an encoded card reader device providing information, encoded on a paystation user's card, to the microprocessor;

a power supply circuit receiving the power and audio signal from the power control circuit and supplying a regulated voltage for the paystation telephone system components; and a backup power source coupled to the memory and the system clock.

8. A paystation telephone system according to claim 6, having a paystation housing wherein one of the plurality of sensors is a housing ground sensor, the housing ground sensor including:

a housing detect relay operable via microprocessor signals to initiate a test of whether the housing is properly grounded; and an isolator circuit coupled between the housing detect relay and the housing to receive current through the housing detect relay during a test of the housing ground and providing a ground status signal to the microprocessor.

9. A paystation telephone system according to claim 6 wherein the paystation telephone system has a cash box, one of the plurality of sensors being a cash box sensor providing a cash box status signal to the microprocessor indicating whether the cash box is present in the paystation telephone system.

10. A paystation telephone system according to claim 4, wherein the coin relay control circuit comprises a coin refund inhibit relay, coupled in circuit with the coin relay, controlled via the microprocessor control signal provided to the coin relay control circuit to open circuit the coin relay to prevent its operation in response to central office generated firing signals.

11. A paystation telephone system according to claim 4, wherein the coin relay control circuit comprises a collect/refund relay having collect and refund circuit paths coupled in circuit with the coin relay and being operable in response to microprocessor control signals to reverse the collect and refund circuit paths.

12. A paystation telephone system according to claim 6, wherein the system clock includes a timer circuit for timing actual connect time between the paystation user and a called party, the timer being operable in response to a connect signal from the call progress circuitry.

13. For use with a paystation telephone system coupled with a telephone line, including a microprocessor, signal processing circuitry line, including a microprocessor, signal processing circuitry and a memory, the microprocessor controlling the operation of the paystation telephone system, a method for remotely configuring the paystation telephone system, comprising the steps of:

downloading firmware from a remote host computer through the telephone line and signal processing circuitry to the memory for controlling the paystation telephone system as either a customer-owned, coin operated telephone (COCOT) or a regulated line telephone;

operating the paystation telephone system via the microprocessor in accordance with the remotely downloaded firmware.

14. A method for determining a mode of operation of a paystation telephone system, coupled with a telephone line, including a microprocessor, signal processing circuitry and a memory, the microprocessor controlling the operation of the paystation telephone system, comprising the steps of:

reading a status word stored in the memory;

checking a status flag in the status word indicating the mode of operation; and controlling the paystation telephone system in accordance with the indicated mode of operation;

wherein a mode of operation can be at least one of a customer owned coin operated telephone (COCOT) mode and a regulated telephone mode.

15. A method for using a paystation telephone system connected with a telephone line, comprising the steps of:

paystation telephone as a customer owned coin operated telephone (COCOT) when the paystation telephone is connected with a business line telephone line;

operating the paystation telephone as a regulated telephone when the paystation telephone is connected to a regulated line telephone line;

performing said operating steps without making hardware changes to the paystation telephone.

16. A method according to claim 15, further comprising the step of selectively enabling and disabling operating features of the paystation when connected to at least one of the business line telephone line and the regulated line telephone line.

17. A method according to claim 15, further comprising the step of:

inhibiting operation of a coin return device, the coin return device being controlled by a coin relay in response to an energizing signal generated by a central office when the telephone paystation system is coupled with the regulated line, the step of inhibiting step comprising the steps of:

arranging a coin inhibit relay in circuit with the coin relay to receive the energizing signal, over an energy signal line, and connect it with the coin relay;

providing a control signal from a microprocessor in the paystation telephone system to open circuit the connection between the energy signal line and the coin relay wherein the coin relay is selectively turned on or off via the control signal.

18. A method according to claim 15, further comprising the step of:

performing voice messaging services when the paystation telephone system is connected to a regulated line, the performing step comprising the steps of:

detecting an off-hook condition of the paystation's handset via a hook switch circuit indicating a telephone call is to be placed;

monitoring the telephone line for the presence of a ring signal, busy signal or an answer by a called party using a microprocessor in the paystation telephone system;

performing normal paystation telephone system functions if the called party answers;

reading a status word stored in a memory via the microprocessor to determine if voice messaging services are available if there is no answer;

requesting an operator input signal if the voice messaging services are available;

once a selection is made, inhibiting the operation of a coin return device controlling a coin relay via a control signal from the microprocessor;

setting a system clock to signal the microprocessor to seize the telephone line once the original telephone call is terminated and terminating the original telephone call;

again seizing the telephone line after the original call is terminated;

reactivating the coin return device via another signal from the microprocessor;

dialing, with the microprocessor, the voice message service;

detecting an on-hook condition of the handset;

allowing a central office to operate the coin return device by energizing the coin relay to collect a previously deposited coin when the paystation is coupled to the regulated line; and operating the coin return device by energizing the coin relay to collect a previously deposited coin when the paystation is connected to the business line.

19. A method according to claim 15, further comprising the step of:

collecting charges, via the paystation telephone system, controlled with a microprocessor, from a paystation user in response to a refund signal generated by a central office when the paystation telephone is connected with the regulated line, for incoming telephone calls received by the user, the collecting step comprising the steps of:

detecting an off-hook condition of a handset;

reading a ring sensor input to the microprocessor to determine whether the paystation was ringing prior to detecting the off-hook condition indicating an incoming or outgoing call;

voicing an incoming call rate, generated by the microprocessor and associated speech circuitry, onto the telephone line for the paystation user if the ring sensor indicates an incoming call;

detecting the payment of the incoming call rate;

detecting an on-hook condition of the handset;

reversing a refund signal line connected to a coin relay controlling the collection and refunding of payments;

releasing the telephone line;

allowing the refund signal generated by the central office when the telephone line is released to fire the coin relay whereby the step of reversing the refund signal line allows the payment to be collected.

20. A method according to claim 15, further comprising the step of:

preventing the unauthorized placement of coin tones on the telephone line through a transmitter circuit in the paystation telephone, the transmitter circuit allowing audio signals from a paystation user to be applied via a handset microphone to the telephone line to which the paystation is connected, the step of preventing comprising the steps of:

detecting the placement of a long distance call from the paystation;

monitoring the telephone line for the presence of coin tones generated by the paystation user; and muting the handset microphone for a predetermined time whenever the coin tones are detected.

21. A method according to claim 20, wherein the step of monitoring includes the steps of:

setting a transmitter filter to pass a first coin tone signal;

detecting, with a microprocessor in the paystation telephone system, whether the first coin tone signal was present;

setting the transmitter filter to pass a second tone signal if the first coin tone signal was detected; and detecting whether the second coin tone signal is present.

22. A method according to claim 15, further comprising the step of:

detecting whether a paystation telephone housing is grounded, the step of detecting comprising the steps of:

initiating a check of the paystation telephone housing's ground connection;

activating a housing ground relay switch to supply current through an isolator circuit to the housing;

reading an output signal provided from the isolator circuit to a microprocessor in the paystation indicating whether or not the current flowed through the isolator circuit for a properly grounded housing; and setting a status flag if said output signal indicates a missing ground connection.

23. A method according to claim 22, further comprising the step of:

reporting the missing ground connection to a central maintenance computer;

24. A method according to claim 15, further comprising the step of:

accurately timing connections for local telephone calls between the paystation and a called station, the step of accurately timing comprising the steps of:

detecting the local telephone call via keypad signal inputs to a microprocessor in the paystation telephone;

monitoring the telephone line for an answer by the called station using call progress circuitry;

starting a timer once the called station answers the local telephone call whereby the actual connect time between the stations is determined.

25. A method according to claim 24 wherein the paystation telephone system is operable to charge for connect time exceeding a predetermined period, the method comprising the further steps of:

signalling when the predetermined period ends;

requesting an additional payment from the paystation user;

determining whether said additional payment was received;

resetting the timer for an additional time period if the additional payment was received.

26. A method according to claim 15, further comprising the step of:

preventing telephone calls when a cash box, storing coins deposited through a coin chute by a paystation user, is missing from the paystation telephone, the step of preventing comprising the steps of:

detecting a coin input into the coin chute of the paystation telephone system;

reading a cash box sensor indicating whether the cash box is present in the paystation telephone system; and inhibiting the generation of one of the coin tones and an initial rate signal onto the telephone line when the cash box sensor indicates the cash box is missing.

27. A method according to claim 15, further comprising the step of:

allowing any pre-authorized type of encoded card to be used in the paystation telephone system when connected to the regulated line which accepts only certain cards, the step of allowing comprising the steps of:

detecting in a microprocessor a card number input via an encoded card reader reading a user's card associated with the paystation telephone system and storing the card number input in memory;

determining whether the user's card is authorized for use by the regulated line;

sending the card number signal over the telephone line if it is authorized by the regulated line;

comparing the stored card number with a list of preauthorized types of encoded cards accepted by the paystation if the stored card number is not authorized by the regulated line;

checking the validity of the stored card number if it is one of the pre-authorized cards;

sending a master card number stored in the paystation, known to be acceptable by the regulated line, over the telephone line when the checking step determines the stored card number to be valid.

28. A method according to claim 27 wherein the step of checking the validity comprises the steps of:

determining whether the stored card number has expired; and determining whether the stored card number is stolen.

* * * * *